June 19, 1951 — C. C. HUITT ET AL — 2,557,602
SANITARY JACKET FOR ICE CREAM CONE
AND METHOD OF MANUFACTURE Filed May 31, 1950 — 3 Sheets-Sheet 1

INVENTORS
CHARLES C. HUITT AND
WARLEY L. PARROTT
BY
Parrott, Richards and Sims
ATTORNEYS June 19, 1951

C. C. HUITT ET AL 2,557,602

SANITARY JACKET FOR ICE CREAM CONE AND METHOD OF MANUFACTURE

Filed May 31, 1950

INVENTORS
CHARLES C. HUITT AND
WARLEY L. PARROTT
BY
Parrott, Richards and Sims
ATTORNEYS June 19, 1951
C. C. HUITT ET AL
2,557,602
SANITARY JACKET FOR ICE CREAM CONE
AND METHOD OF MANUFACTURE
Filed May 31, 1950
3 Sheets-Sheet 3
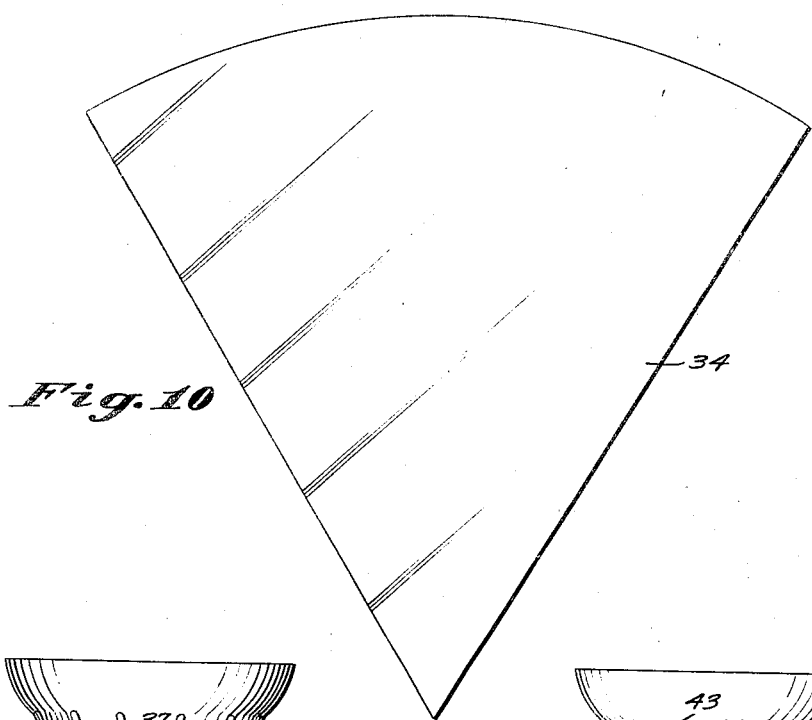
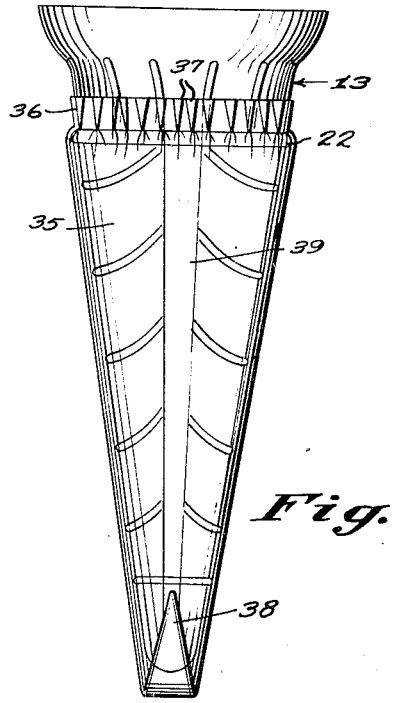
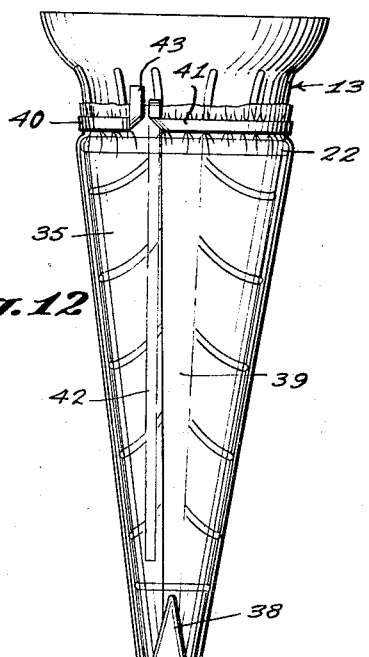
INVENTORS
CHARLES C. HUITT AND
WARLEY L. PARROTT
BY
Parrott, Richards and Sims
ATTORNEYS Patented June 19, 1951

2,557,602

UNITED STATES PATENT OFFICE 2,557,602

SANITARY JACKET FOR ICE-CREAM CONES
AND METHOD OF MANUFACTURE

Charles C. Huitt, Myrtle Beach, S. C., and
Warley L. Parrott, Charlotte, N. C.

Application May 31, 1950, Serial No. 165,126

7 Claims. (Cl. 99—89)

1

This invention relates to sanitary jackets for ice cream cones and more particularly to a heat-sealable, plastic jacket for such purpose.

The jackets heretofore suggested have required some type of adhesive in forming the jacket and for sticking it to the cone so that the jacket would not come off of the cone during nesting and de-nesting of the cones. On a commercial production basis, this has proven a definite limitation and is one of the main reasons for lack in commercial use of ice cream cone jackets.

In accordance with the present invention, the ice cream cone jacket is formed from a thin, flexible, heat-sealable, plastic sheet material such as cellophane, which will heat-seal autogenously to form the jacket and will seal directly to the ice cream cone upon application of the proper amount of heat, thereby avoiding the necessity of any adhesive in the formation or use of the jacket.

The shape and size of the heat-sealed plastic jacket of the present invention will correspond generally with the shape and size of the ice cream cone on which it is to be used. Most of the ice cream cones used today are conical in shape and have a flared top portion for receiving and holding the ice cream. The main body of the cone, below the flared top, has a conical curvature and is generally in the form of a geometric cone, terminating with a small, closed end opposite the flared top end of the cone. Another form of cone has a top flared portion which is substantially cylindrical in shape, and the main body portion of the cone below is frusto-conical in shape. In both of these types of cones, as well as others, the purpose of this invention is to cover the main body portion with the cellophane or other thin, plastic sanitary jacket, which will protect the cone against contamination from the hands of the person filling the cone with ice cream and the hands of the person eating the cone.

We have discovered that when the conical cellophane jacket is fitted over the similarly shaped conical body portion of the ice cream cone below the flared top, and sufficient heat is applied to the jacket, either along a continuous line or at specific points, the jacket will heat-seal to the cone and thereby prevent accidental slipping off of the jacket from the cone during handling. Also, we have found that the cellophane jacket may be held securely on the ice cream cone by forming a constrictive band on the cellophane jacket around the cone and advantageously above the circular "nesting ring" which is used on practically all cones at the junction point between the above-

2 mentioned flared top and the conical body portion of the cone. This nesting ring serves the purpose of keeping the cones in proper spaced relationship when they are telescoped for packing and shipping, and it serves the additional useful purpose here of providing a supporting shoulder for the constrictive cellophane band formed just above the nesting ring for holding the cellophane jacket securely on the cone.

As to the length of the cellophane or similar plastic jacket, this may be varied as desired by the manufacturers of the ice cream cones or the dispensers of the cones, depending upon how they are merchanised. From a strictly sanitary viewpoint, it is desirable to have the jackets extend the full length of the conically shaped body portion of the cone, with a small excess for covering the bottom tip of the truly conical cone or the flat portion of the frusto-conical cone. However, some of the ice cream cone manufacturers may prefer to have the cellophane jacket stop short of the tip so as to eliminate any possible interference in the nesting of the cones for packaging and shipping.

While cellophane is presently considered the commercially advantageous type of thin, heat-sealable plastic sheet material to be used in producing the ice cream cone jacket, the invention contemplates the use of other similar materials which have flexible and heat-sealable properties, including "Pliofilm," nylon, "Vinyon," and cellulose acetate butyrate, etc.

The structural form of the cellophane jacket and its adaptation to different types of ice cream cones are illustrated in the accompanying drawing in which:

Fig. 10 is a plan view of a cellophane blank for forming the full length jackets shown in Figs. 11 and 12;

Fig. 11 is an elevational view of an ice cream cone fitted with a cellophane jacket covering the full length of the body portion of the cone and secured to the cone above the nesting ring by a constrictive heat-sealed portion of the cellophane; and, Fig. 12 is an elevational view of an ice cream cone fitted with a cellophane jacket which is secured to the cone by an encircling band and which also provides a tearing strip for the jacket.

Figure 1:
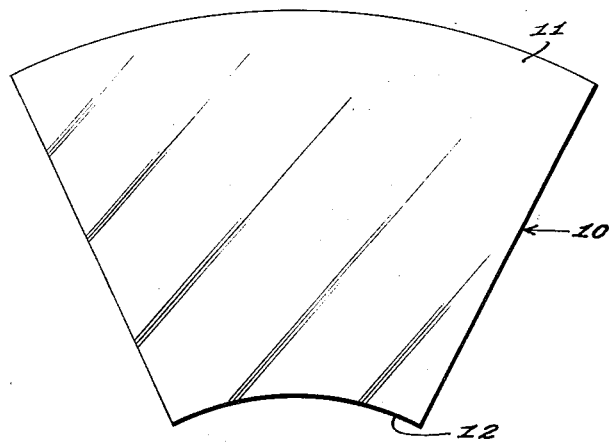
Fig. 1 is a plan view of the cellophane blank from which the conical jacket is formed.

Referring now to the several figures in the drawing and generally in the order in which they occur, the cellophane blank 10 shown in Fig. 1 may be cut from a running web of the cellophane or may be die-cut in large numbers from a stack of cellophane sheets. It has a flared top portion 11 which tapers down to a small bottom portion 12.

Figure 2:
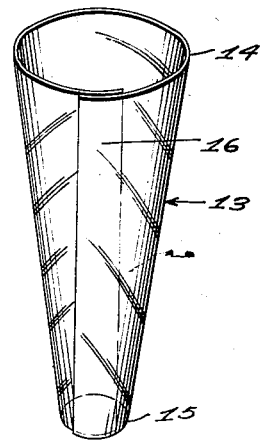
Fig. 2 is a perspective view of a conically shaped cellophane jacket made from the blank of Fig. 1, and adapted to be fitted over and secured to an ice cream cone having a truly conically shaped body portion.

When the blank of Fig. 1 is rolled on a suitable mandrel, it forms the conically shaped jacket 13 shown in Fig. 2, which has a large top opening 14 and a small bottom opening 15, and the jacket is held in place by means of a longitudinal seam 16 which is formed by heat-sealing the overlapped edges of the cellophane sheet.

Figure 3:
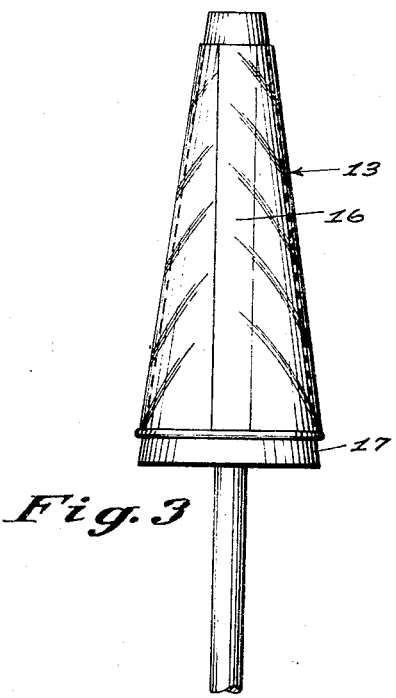
Fig. 3 is an elevational view of a mandrel and cellophane jacket formed thereon.

The conical jacket 13 may be formed on a suitable conically shaped metal mandrel on which the leading edge of the cellophane blank 10 would be held in place and the mandrel rotated to wind the blank around the mandrel and form the overlapping seam 16, whereupon a heated metal clamp or other suitably shaped iron would be brought down upon the seam for a few seconds time sufficient to heat-seal the overlapping edge. This method of production of the conical jackets is illustrated in Fig. 3 by the conically shaped spindle 17, around which the jacket 13 is formed and heat-sealed along the seam 16.

Figure 4:
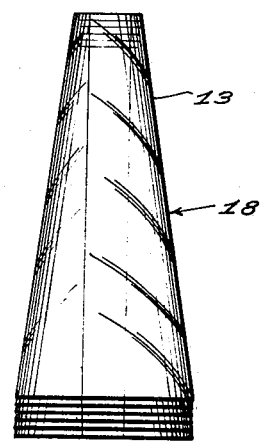
Fig. 4 is an elevational view of a stack of telescoped cellophane jackets.

The cellophane jackets 13 formed in this manner may then be telescoped for packaging and shipment as indicated by the stack 18 in Fig. 4. This telescoped stack of jackets 18 may be shipped in a manner similar to telescoped ice cream cones and may be denested and used individually on ice cream cones as they are dispensed at the soda fountain. When so used, the cellophane jackets does not have to be attached to the ice cream cone, but will simply be held thereon by the person eating the ice cream.

Figure 5:
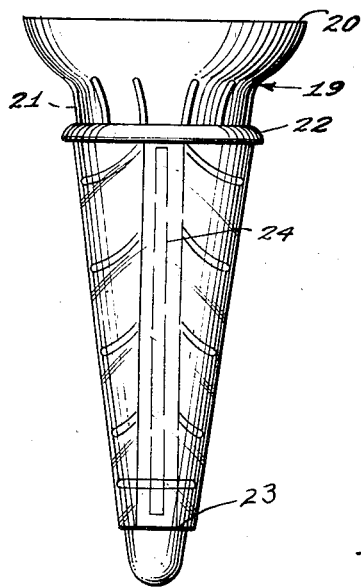
Fig. 5 is an elevational view of an ice cream cone showing the conical jacket of Fig. 2 attached thereto by heat-sealing.

Alternatively, it may be desirable to apply the cellophane jackets directly to the ice cream cones in the ice cream cone manufacturer's plant just after the cones are made. If so, the preformed cellophane jackets shown in Fig. 4 may be telescoped over the ice cream cone as indicated in Fig. 5. The ice cream cone 19 shown in that figure is of the well-known conically shaped pastry type of ice cream cone having an enlarged mouth portion 20 for holding the ice cream, a conical body portion 21, and a nesting ring 22. The conical cellophane jacket 13 abuts the ring 22 at the top and terminates near the bottom of the ice cream cone as indicated at the point 23. For attaching the conical jacket 13 to the cone 19 to that it will not slip off during packaging, shipment or handling, the jacket is heat-sealed to the cone 19 at spaced intervals indicated by the line 24.

Figure 6:
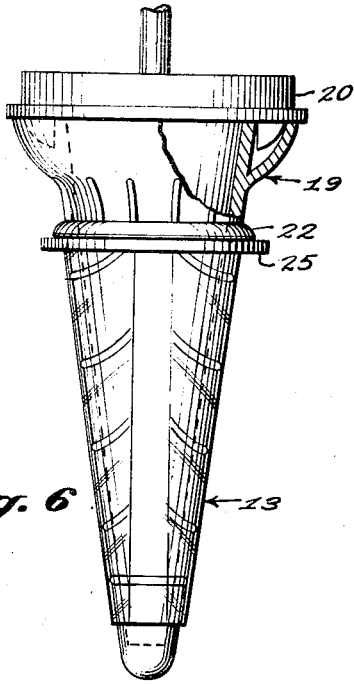
Fig. 6 is an elevational view of an assembly of parts for forming and heat-sealing the cellophane jacket directly on the ice cream cone.

Instead of preforming the cellophane jackets and then applying them to the ice cream cone in the ice cream cone manufacturer's plant as described above, the cellophane jackets may be formed directly on the ice cream cone, using the cone as the forming mandrel, and the heat-sealing operations for forming the jacket and attaching it to the ice cream cone may be carried out all at the same time. This procedure is illustrated in Fig. 6, which shows the ice cream cone 19 held by a chuck 20 which fits inside of the cone and holds the cone in place or rotates it, as desired, while the jacket 13 is being formed around the ice cream cone and heat-sealed thereto in a convenient manner. Instead of an elongated heated arm or clamp for effecting this sealing, an electrically heated ring 25 which encircles the cone just underneath the nesting ring 22 may be used for effecting a circular heat-seal of the jacket to the ice cream cone adjacent the nesting ring.

Figure 7:
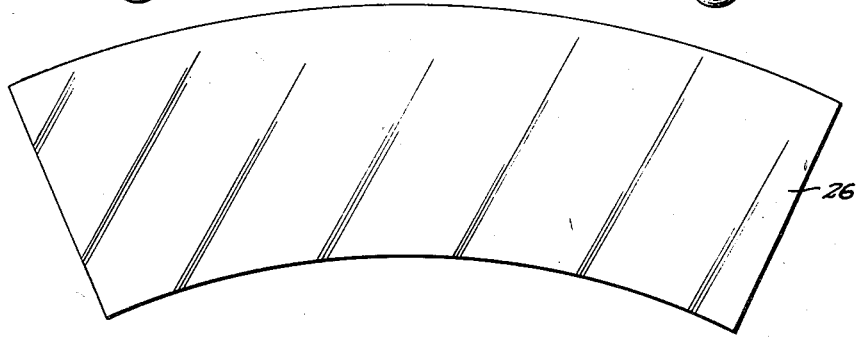
Fig. 7 is a plan view of a cellophane blank from which a frusto-conical jacket may be formed.
Figure 8:
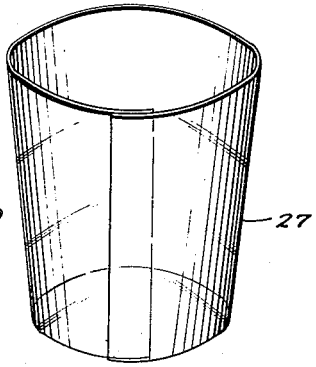
Fig. 8 is a perspective view of the cellophane jacket formed from the blank in Fig. 7 and adapted to fit a frusto-conical form of ice cream cone.

In Fig. 7 is illustrated a blank 26 of a suitable shape and size for use on a flat bottom, somewhat cup-shaped form of ice cream cone which is also now on the market. This blank 26 may be formed into a frusto-conical shape of cellophane jacket 27 shown in Fig. 8. These jackets 27 may be preformed and nested in a similar manner to that illustrated in Figs. 3 and 4 for the conical jackets, or they may be formed directly on the ice cream cone in the manner generally indicated for the conical jacket in Fig. 6 above.

Figure 9:
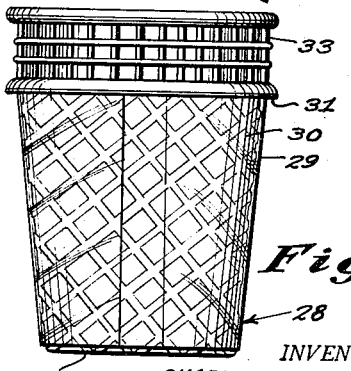
Fig. 9 is an elevational view of an ice cream cone having a frusto-conical body portion fitted with the type of cellophane jacket shown in Fig. 8, and attached thereto by heat-sealing.

The frusto-conical type of cone is illustrated at 28 in Fig. 9, and as shown therein the cellophane jacket 29 covers the main frusto-conical body portion 30. The jacket extends up to the nesting ring 31 and substantially to the bottom of the cone, and, in fact, may extend around the flat bottom 32 of the cone if desired. The top of this cone 28 is provided with a cylindrical portion 33 for holding the ice cream.

In Fig. 10 is illustrated a cellophane blank 34 for use on a conically shaped ice cream cone such as the cone illustrated in Fig. 5 above, but in this instance the blank 34 is cut to sufficient length and size to cover the bottom of the cone as illustrated in Figs. 11 and 12. As shown therein, the cone 13 has the nesting ring 22, and is covered from the bottom and up to and a little above the nesting ring 22, with a cellophane jacket 35. The part of the jacket above the ring 22 is heat-sealed on itself to form a constrictive band on annular ring 36. When a heat-sealing collar or ring (not shown) is applied to the upper edge of the jacket above the nesting ring 22, the excess cellophane pleats and folds upon itself, and the overlapping parts, indicated at 37, seal together and form a firmly fitting constrictive band above the ring 22, which prevents this band from slipping downward over the ring 22. Upward movement of the jacket is prevented by turning up and heat-sealing the small end of the jacket as indicated at 38 in Figs. 11 and 12.

The jacket 35 is formed from the blank 34 shown in Fig. 10. The blank may be cut and wound preliminarily on suitable cone-forming machinery to produce a complete conical jacket before it is applied to the ice cream cone, or the blank may be wound directly on the ice cream cone, using the latter as a mandrel as above described. The overlapping edges of the conical jacket may be heat-sealed together as shown at 39 in Fig. 11.

The cone and jacket shown in Fig. 12 are like those illustrated in Fig. 11 except that the constrictive band 40 in Fig. 12 is formed from an additional narrow cellophane strip 41, which encircles the ice cream cone 13 and which is drawn tightly around the upper edge portion of the cellophane jacket 35 and is heat-sealed thereto.

Where it is desired to provide a tearing strip for easy removal of the cellophane jacket, this may be done as shown at 42 in Fig. 12, the tearing strip being heat-sealed to the underneath side of the cellophane jacket and extending slightly above the top edge of the jacket to provide a tab which can be easily caught by the hand and pulled downward to tear an opening strip in the jacket. In the arrangement shown in Fig. 12, the tearing strip 42 is a continuation of the encircling band 41, and the other end of this band is folded upward to provide the tab 43.

In the foregoing description relating to heat-sealing of the cellophane jacket directly to the ice cream cone, we have found that this requires a slightly higher temperature than the temperature used for the autogenous heat-sealing of the cellophane to form the jacket. With this higher temperature, there appears to be a slight melting or flow of the cellophane or the ice cream cone, or both, at the point or small area where the relatively high temperature is applied. When heat-sealing the jacket directly to the ice cream cone in this manner, pleating or folding of the cellophane upon itself to produce a constrictive band as illustrated in Fig. 11 above, or the use of an additional constrictive band as illustrated in Fig. 12 above, is avoided. In other words, the heat-seal may be obtained directly between one thickness of the cellophane and the contiguous ice cream cone.

We claim:

1. An ice cream cone fitted with a conical, heat-sealed, thin, plastic, sanitary jacket heat-sealed to the cone.

2. An ice cream cone fitted with a conical, heat-sealed, cellophane, sanitary jacket heat-sealed to the cone.

3. An ice cream cone fitted with a conical, heat-sealed, thin, plastic, sanitary jacket retained thereon by autogenously heat-sealed constrictive portions of the jacket surrounding the cone.

4. A method of forming and retaining a conical jacket on an ice cream cone, comprising wrapping a blank of thin, heat-sealable, plastic material around an ice cream cone, applying heat to the overlapping edges of the blank to effect sealing thereof, and applying heat to a portion of the thus formed jacket to provide a constriction thereof and retain the jacket on the ice cream cone.

5. A method of forming and retaining a conical jacket on an ice cream cone, comprising wrapping a blank of thin, heat-sealable, plastic around an ice cream cone, applying heat to the overlapping edges of the blank to effect sealing thereof, and applying heat to a portion of the jacket to effect sealing thereof directly to the cone.

6. An ice cream cone fitted with a frusto-conical, thin, plastic jacket heat-sealed to the cone.

7. A method of forming and retaining a conical jacket on an ice cream cone, comprising wrapping a blank of thin, heat-sealable, plastic material around a mandrel, applying heat to the overlapping edges of the blank to effect sealing thereof, removing the thus-formed conical jacket from the mandrel, fitting it over a similarly shaped ice cream cone, and applying heat to the thus-formed and fitted jacket to effect sealing thereof directly to the cone.

CHARLES C. HUITT.
WARLEY L. PARROTT.

REFERENCES CITED

The following references are of record in the file of this patent:

UNITED STATES PATENTS

| Number | Name | Date |
| --- | --- | --- |
| 1,094,427 | Cook | Apr. 28, 1914 |
| 2,108,418 | Thomas | Feb. 15, 1938 |
| 2,227,428 | Amberg et al. | Jan. 7, 1941 |
| 2,303,420 | Amberg et al. | Dec. 1, 1942 |